United States Patent [19]

Dalton, Jr. et al.

[11] 4,389,390

[45] * Jun. 21, 1983

[54] PROCESS FOR PRODUCING HYDROGEN PEROXIDE

[75] Inventors: Augustine I. Dalton, Jr.; Eugene J. Greskovich; Ronald W. Skinner, all of Allentown, Pa.

[73] Assignee: Air Products and Chemicals, Inc., Allentown, Pa.

[*] Notice: The portion of the term of this patent subsequent to Jun. 22, 1999, has been disclaimed.

[21] Appl. No.: 344,235

[22] Filed: Jan. 29, 1982

Related U.S. Application Data

[63] Continuation-in-part of Ser. No. 195,828, Oct. 10, 1980, Pat. No. 4,336,238.

[51] Int. Cl.$^3$ ............................................. C01B 15/02
[52] U.S. Cl. ................................... 423/584; 252/413
[58] Field of Search ........................................... 423/584

[56] References Cited

U.S. PATENT DOCUMENTS

| | | |
|---|---|---|
| 1,108,752 | 8/1914 | Henkel . |
| 3,333,112 | 8/1967 | Hooper . |
| 3,361,533 | 1/1968 | Hooper . |
| 3,736,265 | 5/1973 | Suggitt ............................... 252/445 |
| 4,007,256 | 2/1977 | Kim et al. . |
| 4,279,883 | 7/1981 | Izumi et al. . |
| 4,336,238 | 6/1982 | Dalton et al. ....................... 423/584 |

OTHER PUBLICATIONS

Kirk-Othmer, ECT, 3rd ed., John Wiley & Sons, N. Y. (1978) 556–563.
Boehm, *Angew. Chem. internat Ed.* vol. 5 (1966) 533–544.
Boehm et al., ibid., vol. 3 (1964) 669–677.
Coughlin et al., *Environmental Science & Technology*, vol. 2 (1968), 219–297.

*Primary Examiner*—O. R. Vertiz
*Assistant Examiner*—Wayne A. Langel
*Attorney, Agent, or Firm*—James C. Simmons; E. Eugene Innis

[57] ABSTRACT

An improvement in a process for producing hydrogen peroxide by contacting a mixture of hydrogen and oxygen with a palladium on carbon catalyst in the presence of an acidic liquid capable of inhibiting decomposition of thus-produced hydrogen peroxide comprises prolonging the useful life of the catalyst by continuous removal of palladium salts produced by solubilization of the catalyst from the acidic liquid, preferably by employing high surface activated carbon as the catalyst support and adsorbent for palladium salts.

14 Claims, No Drawings

PROCESS FOR PRODUCING HYDROGEN PEROXIDE

REFERENCE TO RELATED APPLICATION

This is a continuation-in-part of Dalton, Jr. et al., Ser. No. 195,828, filed Oct. 10, 1980, now U.S. Pat. No. 4,336,238.

BACKGROUND OF THE INVENTION

1. Field of the Invention

This invention relates to an improvement in the manufacture of hydrogen peroxide from hydrogen and oxygen.

2. Prior Art

It has been proposed by Hooper, in U.S. Pat. No. 3,336,112, that preparation of hydrogen peroxide from its elements with a solid catalyst in the liquid phase in the presence of water can be done in the presence of a sequestrative stabilizer for hydrogen peroxide. Data are given for batch runs. This reference proposes that the liquid reaction mixture can be causes to flow over catalyst pellets and and the use of towers packed with catalyst for a continuous process.

It has been proposed by Hooper, in U.S. Pat. No. 3,361,533, that hydrogen peroxide synthesized from its elements, hydrogen and oxygen, in an aqueous liquid medium capable of inhibiting the decomposition of hydrogen peroxide in the presence of a solid catalyst, can be used directly for in situ oxidation of an oxidizable organic material. It has been proposed to carry out the oxidation reaction by passing the liquid containing the organic material being oxidized over a bed of catalyst countercurrent to a stream of hydrogen and oxygen.

Kim et al. in U.S. Pat. No. 4,007,256, disclose a similar direct process with countercurrent flow of an acidic aqueous medium containing an oxidizable material and of hydrogen and oxygen. The aqueous medium also contains a nitrogenous organic co-solvent.

Izumi et al. have proposed, in U.S. Pat. No. 4,279,883, a continuous process for preparing hydrogen peroxide, using an aqueous medium. A stirred system is suggested.

Henkel et al., in U.S. Pat. No. 1,108,752, have proposed a process for producing hydrogen peroxide from its elements, in which hydrogen peroxide is removed continuously as it is formed and a corresponding volume of water is fed to the reaction. The catalyst is clay pipe impregnated with palladium. The reaction medium and oxygen flow through the pipe and react with hydrogen passed through the walls.

SUMMARY OF THE INVENTION

In accordance with the present invention, there is provided an improvement in a process for producing hydrogen peroxide directly from hydrogen and oxygen, employing a palladium on carbon catalyst in an acidic liquid, comprising prolonging effective catalyst life by continuously removing palladium salts produced by catalyst solubilization from the acidic liquid.

DETAILED DESCRIPTION

Comparative tests of palladium on silica gel and carbon under batch reactor similar to those of the Hooper U.S. Pat. No. 3,336,112, supra, surprisingly indicated that loss of palladium by solubilization was markedly lower for palladium on activated carbon catalysts than for other catalysts and that palladium on activated carbon catalysts gave superior yields of hydrogen peroxide. This result was unexpected, in view of Hooper's apparent preference for silica-based catalysts.

It has also been found that one or more products of the hydrogen peroxide synthesis markedly decrease the activity of the palladium on carbon catalyst, as shown by a plateau in or reduction of hydrogen peroxide concentration at long reaction times:

(1) Catalyst used in batch preparation of hydrogen peroxide becomes deactivated and is not regenerated to its initial activity by removal from the reactor, treatment with solvent and drying.

(2) Addition of soluble palladium, in the form of $PdCl_4^{--}$, to a batch reaction for synthesizing hydrogen peroxide markedly reduces hydrogen peroxide yield in comparison to batches containing no soluble palladium at the outset. This is observed even when catalyst dissolution losses are reduced by use of activated carbon supports.

(3) Pretreatment of palladium on carbon catalyst with hydrogen peroxide markedly decreases the activity of the catalyst in batch synthesis of hydrogen peroxide.

It was surprisingly found that synthesizing hydrogen peroxide by a continuous process using an activated carbon catalyst support resulted in substantially higher catalyst life than in batch processes. A further advantage is a significant lowering of organic peroxide level, compared to batch processes. In a continuous run lasting 100 hours, 9400 moles of hydrogen peroxide were produced per mole of palladium with 30% loss of catalyst activity. Catalyst used in a batch operation, without provision for removal of soluble palladium salts, was completely deactivated in 3 hr and produced only about 364 moles of hydrogen peroxide per mole of palladium.

It is thought that the continuous process is superior to the batch process because removal of $PdCl_4^{--}$ or other soluble palladium species avoids the danger of catalyst inactivation by redeposition of soluble palladium. In addition, a continuous process is generally more acceptable for economic reasons.

An unexpected aspect of the continuous reaction, employing activated carbon as catalyst support, or the batch reaction with removal of palladium salts is that the concentrations of either of hydrochloric acid or sulfuric acid, or of both, in the reaction mixture can be decreased without loss of selectivity. In a continuous run lasting 285 hours, 18,500 moles of hydrogen peroxide per mole of palladium had been obtained after 185 hr, using solvent which was 0.05 N in sulfuric acid and 0.0013 N in hydrochloric acid.

Aqueous liquids contemplated for use in the practice of this invention are those containing up to 95% by volume of an aldehyde, ketone or alcohol or other oxygenated organic solvent. Nitrogenous solvents such as disclosed by Kim, supra, can also be used. Preferably, the solvent will contain 70-90% by volume of an alcohol or ketone, most preferably acetone or methanol. Methanol, containing up to 5% by volume of water can also be used.

The acidic liquid contains either hydrochloric acid or sulfuric acid, or both. The preferred range of hydrochloric acid during normal operation is 0.0005-0.005 N and of sulfuric acid 0.025-0.2 N. Preferably, both acids are present and the overall acidity of the acidic liquid is 0.0255-0.205 N.

A variety of reactor configurations can be used to achieve continuous removal of palladium-containing dilute hydrogen peroxide solution from the site of synthesis.

(1) Batch reactor comprising a reactor vessel, stirring means, means for introducing hydrogen and oxygen below the surface of the liquid reaction mixture, vent means for removing gases and means external to the reactor for removal of soluble catalyst components and return of liquid to the reactor.

(2) Continuous single stage reactor comprising a reaction vessel fitted with inlets for hydrogen and oxygen below the surface of the liquid reaction mixture, stirring means, inlet and outlet for liquid product containing hydrogen peroxide and for aqueous acidic liquid, and vent means for gases.

(3) Continuous single stage reactor further fitted with means external to the reactor for recovery of soluble palladium and recycle of liquid to the reactor.

(4) Multiple stage continuous reactor with provision for external interstage palladium removal.

(5) Continuous cocurrent upward flow reactor comprising a vertical reactor packed with catalyst, provided with means for percolating hydrogen, oxygen and aqueous acidic reaction medium upwardly through the catalyst bed, venting means for gases and means at the top of the reactor for removing liquid product.

(6) Continuous countercurrent reactor comprising a vertical reactor packed with catalyst, means for introducing gas upwardly through the catalyst bed, means for passing aqueous acidic liquid downwardly through the catalyst bed, means at the bottom of the reactor for removing liquid product containing hydrogen peroxide and means at the top of the reactor for venting gases.

(7) Continuous cocurrent downflow reactor comprising a vertical reactor packed with catalyst, means for percolating acidic aqueous liquid, hydrogen and oxygen downwardly through the catalyst bed and means at the bottom of the reactor for removing gases and liquid product containing hydrogen peroxide.

(8) Continuous cross-flow reactor comprising a vertical reactor packed with catalyst, means for passing hydrogen and oxygen upwardly through the catalyst and means at the top of the reactor for venting gases, and means for passing acidic aqueous liquid horizontally across the catalyst bed and means for removing liquid product.

In the case of batch reactors or continuous reactors with liquid recycle, removal of palladium salts from the liquid product can be achieved using activated non-graphitic carbon or an ion-exchange resin, whereupon the liquid thus freed of palladium can be recycled to the reactor until the desired peroxide concentration is attained.

Representative ion-exchange resins which can be used are basic styrene-divinylbenzene copolymeric anion exchange resins having quaternary ammonium functionality, such as Amerberlite IRA-900 or IRA-93 (Rohm & Haas Co.), in the chloride form. Amberlite IRA-93 free base can be converted to the chloride form prior to use.

"Activated carbon," "carbon black," or "non-graphitic carbon," as used in the specification and claims, means high surface area carbons, produced by heating carbon from various sources, including wood, coconut shells, and bituminous coal. The activated carbons used for removal of soluble palladium salts will be non-graphitic and have a surface area above about 400 $m^2/g$. Preferably the carbons used in this context will have a surface area of 800-1200 $m^2/g$.

"Non-graphitic" carbon is also synonymous with "microcrystalline carbon," as described in Kirk-Othmer, "Encyclopedia of Chemical Technology," 3rd edition, John Wiley & Sons, New York (1978), at 556–563; Boehm, *Angew. Chem.,* internat. Ed., vol. 5 (1966), 533–544; Boehm et al., ibid., vol. 3 (1964), 669–677 and Coughlin et al., *Environmental Science and Technology,* vol. 2 (1968), 219–297.

Although surface area is a very important criterion in selecting activated carbon supports useful in the practice of this invention, preferred support materials will also be relatively inactive in catalyzing the decomposition of hydrogen peroxide. As a guideline, carbons of appropriate surface area, which decompose less than about 25% of 5% aqueous hydrogen peroxide in 5 hours under ambient conditions, will be preferred.

Of the reactor configurations described, a continuous reactor employing a packed bed of catalyst with cocurrent upward flow of acidic aqueous liquid, hydrogen and oxygen and for venting of gases and discharge of solvent containing hydrogen peroxide from the top region of the reactor, is preferred. Most preferably, the reaction medium used will be an aqueous acidic solution containing 70–90% by volume of acetone or methanol and which is 0.0005–0.005 N in hydrochloric acid and 0.025–0.2 N in sulfuric acid. Also preferred is methanol, without added water, containing similar levels of acid.

It is postulated that use of continuous packed bed reactors, in which mechanical agitation is unnecessary to maintain an even dispersion of catalyst and in which liquid and gas feed velocities can be controlled so as to avoid fluidization, result in improved catalyst life by decreasing catalyst attrition occurring in other reactor configurations.

A further advantage of the cocurrent packed bed reactor is that a continuous plug flow reaction is, or can be, carried out, whereby only a portion of the catalyst bed is subjected to maximum concentrations of hydrogen peroxide and dissolved palladium. Improved catalyst life is expected both because catalyst deactivation is greater at higher peroxide concentrations and because high hydrogen peroxide concentrations occur only near the reactor outlet, owing to the continuous removal of soluble palladium (as $PdCl_4^{--}$) and hydrogen peroxide.

Another aspect of this invention is that deactivated catalysts, can be reactivated by simply increasing the concentration of hydrochloric acid in the aqueous medium to about 0.01 N and of sulfuric acid to about 0.1 N for 1 to 20 hours.

When synthesis of hydrogen peroxide is done as above, at a temperature of 0°–30° C., deactivated catalyst can be regenerated by increasing the temperature in the reactor to about 50° C. for 0.5 to 5 hours.

Without further elaboration, it is believed that one skilled in the art, can, using the preceding description, utilize the present invention to its fullest extent. The following specific embodiments are, therefore, to be construed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

Two grams of 5% palladium on activated carbon were charged to a stirred glass batch reactor containing 275 ml of 75% acetone-25% water by volume which was 0.1 N in sulfuric acid and 0.01 N is hydrochloric acid, and contained 100 ppm of each of sodium meta- and pyrophosphates. After cooling to 0° C., hydrogen and oxygen were sparged through the solvent and catalyst at 0.6 scfh, respectively, at a pressure of 125 psig. The concentrations of hydrogen peroxide accumulated and dissolved or soluble catalyst were determined as a function of time by titration with standardized potassium permanganate solution and atomic absorption spectroscopy, respectively.

The following results were obtained:

| Elapsed Time, hrs. | $H_2O_2$ Conc., M | Solubilized Pd $\mu g/cc$ | % of Charged Catalyst |
|---|---|---|---|
| 0.25 | 0.282 | 24.48 | 6.73 |
| 0.50 | 0.426 | 23.28 | 6.33 |
| 1.00 | 0.647 | 19.42 | 5.22 |
| 1.50 | 0.855 | 7.22 | 1.90 |
| 2.00 | 0.952 | 5.73 | 1.48 |
| 3.00 | 1.25 | 3.40 | 0.88 |
| 4.00 | 1.25 | 2.76 | 0.70 |

The catalyst had produced 364 moles of hydrogen peroxide per mole of palladium after 3 hours, at which point catalyst deactivation was essentially complete.

EXAMPLE 2

Using palladium on silica gel catalyst, the experiment described in Example 1 was repeated, with the following results:

| Elapsed Time, hrs. | $H_2O_2$ Conc., M | Solubilized Pd $\mu g/cc$ | % of Charged Catalyst |
|---|---|---|---|
| 0.17 | 0.08 | 29.67 | 8.16 |
| 1.00 | 0.27 | 62.25 | 17.12 |
| 5.50 | 0.73 | 65.89 | 18.12 |

These experiments indicate that higher yields of hydrogen peroxide are obtained, with less loss of palladium catalyst by dissolution, using a palladium on activated carbon catalyst, rather than palladium on silica gel, a preferred catalyst of Hooper, U.S. Pat. No. 3,336,112.

EXAMPLE 3

The experiment described in Example 1 was repeated, except that the reaction was allowed to continue for a longer time and that the concentration of hydrolyzable organic peroxides, expressed as hydrogen peroxide, was determined by titration of two separate samples with standardized $KMnO_4$ solution. The first sample was titrated immediately for $H_2O_2$. The second sample was prehydrolyzed with 3% by weight of sulfuric acid at room temperature, to liberate hydrogen peroxide from organic peroxides. The difference between the results of the two titrations was taken as the concentration of organic peroxides.

Results obtained were:

| Elapsed Time, hrs. | $H_2O_2$ Conc., M | Conc. Organic Peroxides, M |
|---|---|---|
| 1 | 0.40 | |
| 2 | 0.8 | |
| 3 | 1.1 | |
| 4 | 1.3 | 0.20 |
| 5 | 1.5 | 0.24 |
| 6 | 1.5 | 0.26 |

These data indicate that accumulation of peroxides becomes significant in aqueous acetone after long reaction periods and that hydrogen peroxide yield also levels off.

EXAMPLE 4

The experiment described in Example 1 was repeated, except that concentrations of sulfuric acid and hydrochloric acid were reduced to 0.025 N and 0.0025 N, respectively.

Results were:

| Elapsed Time, hrs. | $H_2O_2$ Conc. M |
|---|---|
| 0.5 | 0.5 |
| 1.0 | 0.72 |
| 2.0 | 0.94 |
| 2.5 | 0.93 |
| 2.8 | 0.68 |
| 3.5 | 0.33 |
| 4.5 | 0.30 |

This experiment demonstrates that the concentrations of sulfuric acid and hydrochloric acid cannot be reduced significantly, in a batch reaction, without decreasing hydrogen peroxide yield.

EXAMPLE 5

(a) At the end of 4 hours of an experiment as in Example 1, the catalyst was removed from the reaction mixture by filtration and dried. The dried catalyst was charged to a reactor containing fresh solvent mixture and the preparation of hydrogen peroxide was attempted, as in Example 1. Results were:

| Elapsed Time, hrs. | $H_2O_2$ Conc., M |
|---|---|
| 0.5 | 0.10 |
| 2.5 | 0.11 |

(b) The above experiment was repeated except that, at the end of 4 hours, the catalyst was washed several times each with acetone and water and then dried. The catalyst was charged to a reactor containing fresh solvent. After 2 hours, the concentration of hydrogen peroxide was 0.06 M.

EXAMPLE 6

The influence of dissolved palladium on catalyst activity was investigated in an experiment, otherwise as in Example 1, except that the solvent contained a soluble palladium compound (43 ppm of sodium tetrachloropalladate $Na_2PdCl_4$), toward which hydrogen peroxide is stable under the conditions of the reaction. The following results were obtained:

| Elapsed Time, hrs. | $H_2O_2$ Conc., M |
|---|---|
| 1 | 0.3 |
| 2 | 0.62 |
| 3 | 0.84 |
| 3.5 | 0.88 |

-continued

| Elapsed Time, hrs. | H$_2$O$_2$ Conc., M |
|---|---|
| 4 | 0.88 |

These results clearly indicate that soluble palladium has an adverse effect on hydrogen peroxide yield and that removal of solubilized palladium from the medium in the reaction vessel is of great importance.

EXAMPLE 7

The effect of hydrogen peroxide on the palladium catalyst used for the synthesis of hydrogen peroxide from its elements was determined by stirring a suspension of 2 g of 5% palladium on activated carbon catalyst in 100 ml of water with 45 ml of 30% aqueous hydrogen peroxide at 0° C. Following rapid decomposition of the hydrogen peroxide, owing to the absence of inhibitors, the catalyst was filtered, dried and used in an experiment otherwise as in Example 1. At the end of 3 hours, the concentration of hydrogen peroxide was 0.03 M.

This experiment suggests that hydrogen peroxide also deactivates the catalyst used for hydrogen peroxide synthesis and indicates the desirability of withdrawing product hydrogen peroxide from the medium in the reactor.

EXAMPLE 8

A continuous reactor for the preparation of hydrogen peroxide from hydrogen and oxygen consisted of a vertical tube packed with palladium on activated carbon catalyst and equipped for upward cocurrent inflow of hydrogen, oxygen and solvent. Each of the inflow systems was equipped with metering means and a source of hydrogen, oxygen or solvent. The reactor was a pipe 5 feet in length and 1.28 inches in inner diameter, lined with polytetrafluoroethylene and jacketed to permit circulation of a cooling medium. At the top of the reactor, which was equipped with a blow-out disc, was a device for the removal of liquid samples, means for transferring the reactor effluent to a liquid-gas separator and means for introducing a diluent stream of nitrogen. The gas separated in the liquid-gas separator was vented and the liquid effluent retained. Analysis for hydrogen peroxide was done as in Example 1.

80% acetone-20% water by volume as solvent.

The reactor was packed with 200 gms of 0.2% palladium on activated carbon catalyst. A solvent consisting of 80% acetone-20% water, which was 0.1 N in sulfuric acid and 0.01 N in hydrochloric acid and contained 100 ppm of each of sodium meta- and pyrophosphates, was passed up through the catalyst bed at a rate of 0.883 L/hr (1.6 LHSV). Hydrogen and oxygen were introduced at 1.61 and 4.61 scfh, respectively. The pressure was 150 psig and the temperature 27° C. After 4 hours, the hydrogen peroxide concentration in the effluent was 0.57 molar, which corresponds to a rate of accumulation of peroxide of 1.2 mole hydrogen peroxide/gm palladium/hr, at 40% selectivity. Selectivity is $$100\% \times \frac{\text{moles/hr H}_2\text{O}_2 \text{ leaving reactor}}{\text{moles/hr H}_2 \text{ consumed.}}$$

After 100 hours, 9400 moles of hydrogen peroxide had been produced per mole of palladium and the catalyst had lost 30% of its initial activity.

The concentration of organic peroxide varied from 0.01 to 0.03 M during the first 72 hours of the run.

EXAMPLE 9

The effect of decreasing hydrochloric acid concentration in a continuous process was determined by changing hydrochloric acid concentration during a run otherwise as in Example 8. The following results were obtained:

| HCl Conc., M | Selectivity, % |
|---|---|
| 0.01 | 39 |
| 0.005 | 43 |
| 0.0025 | 43 |
| 0.0013 | 47 |
| 0 | 5 |

EXAMPLE 10

The influence of sulfuric acid concentration on reaction rate and selectivity during a continuous reaction was determined in an experiment, otherwise as in Example 8, but in which a homogeneous mixture of 200 g of 0.5% palladium on activated carbon and 200 g of blank carbon black were employed as the catalyst bed. Results were:

| H$_2$SO$_4$ Conc., N | H$_2$O$_2$ Conc., M | Selectivity, % |
|---|---|---|
| 0.3 | 0.22 | — |
| 0.2 | 0.27 | 46 |
| 0.1 | 0.33 | 47 |
| 0.05 | 0.45 | 51 |
| 0.025 | 0.62 | 49 |

EXAMPLE 11

The long term effect of simultaneous reduction in concentrations of hydrochloric and sulfuric acids on palladium dissolution and catalyst life was investigated in an experiment, as in Example 8, except that the sulfuric acid and hydrochloric acid concentrations were varied. The run time was 285 hours, for the first 185 hours of which acid concentrations were 0.05 N in sulfuric acid and 0.0013 N in hydrochloric acid. The initial peroxide accumulation rate was 1.12 mole of hydrogen peroxide/gm palladium/hr at 50% selectivity, with 0.55 M hydrogen peroxide in the effluent. Initial palladium loses were high (0.88 mg/L), owing to release of entrained catalyst "fines" in the bed. Subsequent losses (after about 12 hours) were relatively constant (0.2 ppm). At the end of 185 hours, 18,500 moles of hydrogen peroxide had been accumulated per mole of palladium catalyst. The concentration of organic peroxides in the reaction effluent never exceeded 0.05 M and typically was 0.02 M.

After 185 hours' operation, the sulfuric acid concentration was reduced to 0.025 N, without loss of selectivity.

During the last 30 hours' run time, the concentrations of sulfuric acid and hydrochloric acid were increased to 0.1 N and 0.01 N, respectively, for 20 hours and again reduced to 0.025 N and 0.0013 N. This treatment resulted in restoring the catalyst to 69% of its initial activity.

After 285 hours of operation, 25,000 moles of hydrogen peroxide had been produced per mole of palladium, with only 31% loss of catalyst activity. This corresponds to a 190-fold increase in catalyst half-life over that obtained in a batch operation.

EXAMPLE 12

Regeneration of partially deactivated catalyst was demonstrated in a run in which the reactor described in Example 8 was packed with 200 g of a 1:1 homogeneous mixture of 0.5% palladium on activated carbon and carbon black. Solvent (80:20 acetone:water by volume, containing 100 ppm of each of sodium meta- and pyrophosphates and which was 0.1 N in sulfuric acid and 0.01 N in hydrochloric acid) was passed upwardly through the bed at a rate of 0.813 L/hr. Hydrogen and oxygen were introduced cocurrently upwardly through the packed bed at rates of 1.95 and 4.7 scfh, respectively, and 150 psig. The temperature was 27° C.

The initial concentration of hydrogen peroxide in the effluent was 0.55 M, decreasing to 0.44 M owing to mechanical difficulties with the apparatus. At the end of 80 hours, the output of hydrogen peroxide had decreased to 0.36 M, corresponding to 18% loss of catalyst activity. The temperature in the reactor was increased to 49° C. and returned to 27° C. over a period of 5 hours, whereupon hydrogen peroxide output returned to 0.44 M.

EXAMPLE 13

Acetone solutions used in Examples 8-12 were replaced by 80:20 methanol:water by volume, containing 0.2% by weight of formaldehyde and 100 ppm of each of sodium meta- and pyrophosphates and which was 0.035 N in sulfuric acid and 0.0013 N in hydrochloric acid. The solvent was passed upwardly through the catalyst bed of 465 g of a 1:1 homogeneous mixture of 0.2% palladium on activated carbon and carbon black, at a rate of 1.5 L/hr.

Hydrogen and oxygen were introduced cocurrently and upwardly at rates of 1.8 scfh and 26.9 scfh, respectively. The pressure and temperature were 100 psig and 7° C. After 15 hours, the hydrogen peroxide accumulation rate was 0.83 mole hydrogen peroxide/gm palladium/hr at 77% selectivity. The effluent contained 0.28 M hydrogen peroxide. Increasing the pressure to 150 psig increased the rate of 0.99 mol hydrogen peroxide/gm palladium/hr, with a selectivity of 80%.

EXAMPLE 14

Removal of palladium by activated carbon was demonstrated in experiments in which about 200 ml of 80:20 acetone:water (by volume) solution, containing 1% of hydrogen peroxide was placed in a borosilicate flask previously passivated toward hydrogen peroxide decomposition by soaking in 7% aqueous hydrogen peroxide solution. The volume of solution was brought to 200 ml by addition of the indicated amount of PdCl solution. Following addition of PdCl$_2$ solution, 12×16 PCB carbon (Calgon) was added to the unstirred solution. The time at which the carbon was added was designated $T_o$. After 0.5 hours, aliquots were withdrawn and analyzed for dissolved palladium by atomic absorption spectroscopy.

The following results were obtained:

| Acetone/Water Solution Containing 1% H$_2$O$_2$ | | |
|---|---|---|
| ppm Dissolved Palladium | | mg/l hr. |
| Initial | 0.5 Hr. | Redeposition Rate |
| 500 | 76.0 | 763 |
| 100 | 20.3 | 144 |
| 20 | 2.65 | 31 |

These results suggest that a combination of soluble palladium and hydrogen peroxide promote redeposition of palladium on activated carbon.

EXAMPLE 15

A continuous run is carried out as in Example 8, except that the packed bed comprises a mixture of palladium on activated carbon catalyst and an anion-exchange resin. Results obtained are similar to those of Example 8.

EXAMPLE 16

Decomposition of hydrogen peroxide (5% aqueous solution) by various carbon blacks (activated carbons) at 27.7° C. was determined by titration with potassium permanganate. The amount of carbon employed was 2 g in 275 ml of solution. Results for carbon blacks having varying physical properties are given in the Table.

| Carbon[a] | Percent Ash Max | % Acid Solubles | Surface Area m$^2$/g | Total Pore Vol. cc/g | Pore Diameter Distribution | 5% Aq. H$_2$O$_2$ Decomp., % 27.7° C. 2 hr. | 5 hr. |
|---|---|---|---|---|---|---|---|
| Nuchar #109[c] | — | — | — | — | — | 84.8 | 100 |
| BPL 4 × 8[d] | 8 | — | 1050–1150 | 0.70 | 43% 10–20 Å | 85.0 | 97.6 |
| RB Pulv | 23 | — | 1250–1400 | 1.22 | 16% 18–20 Å 41% 20–100 Å | 93.7 | 98.6 |
| DARCO-S51[e] | — | — | 672 | — | 78% 0–40 Å | 56.5 | 78.3 |
| DARCO KB | 3–6 | 2 | 1690 | — | 74% 0–40 Å 19% 40–100 Å | 8.3 | 14.0 |
| DARCO G 60 | — | — | — | — | — | 15.3 | 22.9 |
| DARCO G 60[f] Special | — | — | 1100 | — | 0.427 cc/g between 20–1000 Å | 9.6 | 14.3 |
| DARCO Carbon | — | — | — | — | — | 10.2 | 22.9 |
| Columbia 3LC-6/8 | 2 | — | (b) | — | — | 9.4 | 15.8 |

[a] Physical properties are those given by supplier
[b] No data available, CCl$_4$ number indicates surface area 5–900
[c] Wood-based carbon
[d] Bituminous coal base
[e] Lignite (or wood) base
[f] Special pure grade of G-60

EXAMPLE 17

Removal of soluble palladium from hydrogen peroxide solution by an ion-exchange resin was demonstrated in an experiment in which anion-exchange resin (Amberlite IRA-938) in the chloride form, 10 g) was charged to a 500-ml Erlenmeyer flask containing 200 ml of aqueous solution which was 1.6 M with respect to hydrogen peroxide, 0.1 N in sulfuric acid and 0.01 N in hydrochloric acid and contained 500 ppm of palladium (as $PdCl_4^{--}$). The mixture was maintained at 24° C. and swirled mechanically. Analysis of palladium content of aliquots removed at intervals was done by atomic absorption spectroscopy. Results were:

| Time (hr) | $PdCl_4^=$ (ppm) |
|---|---|
| 0 | 398 |
| 0.6 | 21.3 |
| 1 | 11.1 |
| 4 | 1 |
| 6 | 0.3 |

EXAMPLE 18

The reactor described in Example 8 was packed with a homogeneous blend of 363 g of 0.2% palladium on carbon catalyst and 121 g of carbon black. Solvent mixtures which were 0.025 N in sulfuric acid and 0.013 N in hydrochloric acid and contained 100 ppm of each of sodium meta- and pyrophosphates, were used. The temperature was kept at 7° C. Hydrogen was added at rate of 1.67 scfh and oxygen at a rate of 26.84 scfh and 150 psig.

Methanolic medium, pumped through the reactor at a rate of 0.838 L/hr, gave a hydrogen peroxide yield after 24 hr of 0.369 M. The hydrogen selectivity was 73.3% and the Mmol/mol Pd-hr 45.32.

Methanol:water (80:20 by volume) gave, after 61.21 hours, 0.191 M hydrogen peroxide. The selectivity was 48.5% the Mol/mol Pd/hr 23.46.

What is claimed is:

1. In a process for producing hydrogen peroxide by contacting a mixture of gases comprising hydrogen and oxygen with a palladium catalyst supported on a carbon base in a reaction vessel in the presence of an acidic aqueous liquid, containing 70 to 95% by volume of an oxygenated or nitrogenous organic solvent, or methanol containing up to 5% by volume of water, capable of inhibiting the decomposition of thus-produced hydrogen peroxide, the improvement comprising prolonging effective catalyst life by continuously removing from the acidic liquid in the reaction vessel palladium salts produced by solubilization of the palladium catalyst, employing as the carbon catalyst an activated non-graphitic carbon having a surface area above 400 $m^2/g$, which carbon adsorbs palladium salts produced by solubilization of the palladium catalyst.

2. The process of claim 1, wherein the acidic liquid contains 70 to 90% by volume of acetone or methanol and is 0.0005–0.005 N in hydrochloric acid and 0.025–0.2 N in sulfuric acid and wherein hydrogen, oxygen and acidic liquid are cocurrently passed upwardly through a packed bed of palladium on carbon catalyst.

3. The process of claim 2, wherein catalyst is reactivated by increasing the concentration of hydrochloric acid to about 0.01 N and of sulfuric acid to about 0.1 N for 1 to 20 hours.

4. The process of claim 2, conducted at 0-30° C., wherein deactivated catalyst is regenerated by increasing the reaction temperature to about 50° C. for 0.5 to 5 hours.

5. The process of claim 2, wherein the process is a plug flow reaction.

6. The process of claim 2, wherein the carbon base has a surface area of 800–1200 $m^2/g$ and the process is a plug flow reaction.

7. The process of claim 1, wherein the overall acidity of the acidic liquid is 0.0255–0.205 N.

8. The process of claim 1, wherein the acidic liquid contains 70 to 95% by volume of a ketone, aldehyde or alcohol of up to 4 carbon atoms.

9. The process of claim 1, wherein the acidic liquid is methanol with up to 5% by volume of added water.

10. The process of claim 1, wherein hydrogen, oxygen and acidic liquid are cocurrently passed upwardly through a bed of palladium catalyst on an activated carbon base and the activated carbon has a surface area of 800–1200 $m^2/g$.

11. In a process for producing hydrogen peroxide by contacting a mixture of gases comprising hydrogen and oxygen with a palladium catalyst supported on a carbon base in the presence of an acidic aqueous liquid, containing 70 to 95% by volume of an oxygenated or nitrogenous organic solvent, or methanol containing up to 5% by volume of water, capable of inhibiting the decomposition of thus-produced hydrogen peroxide, the improvement comprising prolonging effective catalyst life by continuously removing from the acidic liquid in the reaction vessel palladium salts produced by solubilization of the palladium catalyst by mixing with the carbon base an anion-exchange resin, capable of removing palladium salts.

12. The process of claim 11, wherein the anion-exchange resin is activated non-graphitic carbon having a surface-area above 400 $m^2/g$.

13. In a process for producing hydrogen peroxide by contacting a mixture of gases comprising hydrogen and oxygen with a palladium catalyst supported on a carbon base in a reaction vessel in the presence of an acidic liquid capable of inhibiting the decomposition of thus-produced hydrogen peroxide, the improvement comprising prolonging effective catalyst life by continuously removing from the acidic liquid in the reaction vessel palladium salts produced by solubilization of the palladium catalyst, wherein removal of palladium salts is effected by activated nongraphitic carbon, having a surface area above 400 $m^2/g$, external to the reaction vessel in which hydrogen peroxide is prepared and liquid freed of palladium salts is returned to the reaction vessel.

14. The process of claim 1, conducted at 0°–30° C., wherein deactivated catalyst is regenerated by increasing the reaction temperature to about 50° C. for 0.5 to 5 hours.

* * * * *